(12) United States Patent
Hafner et al.

(10) Patent No.: US 9,587,044 B2
(45) Date of Patent: Mar. 7, 2017

(54) POLYPROPYLENE WITH EXTREME BROAD MOLECULAR WEIGHT DISTRIBUTION

(71) Applicant: Borealis AG, Vienna (AT)

(72) Inventors: Norbert Hafner, Linz (AT); Klaus Bernreitner, Linz (AT); Marcus Gahleitner, Neuhofen/Krems (AT)

(73) Assignee: Borealis AG (AT)

( * ) Notice: Subject to any disclaimer, the term of this patent is extended or adjusted under 35 U.S.C. 154(b) by 0 days.

(21) Appl. No.: 14/895,141

(22) PCT Filed: Jun. 10, 2014

(86) PCT No.: PCT/EP2014/062017
§ 371 (c)(1),
(2) Date: Dec. 1, 2015

(87) PCT Pub. No.: WO2014/202430
PCT Pub. Date: Dec. 24, 2014

(65) Prior Publication Data
US 2016/0115258 A1    Apr. 28, 2016

(30) Foreign Application Priority Data

Jun. 19, 2013 (EP) .................................... 13172871

(51) Int. Cl.
| C08F 2/00 | (2006.01) |
| C08F 4/00 | (2006.01) |
| C08F 4/12 | (2006.01) |
| C08F 110/06 | (2006.01) |
| C08F 10/06 | (2006.01) |
| C08L 23/12 | (2006.01) |
| C08L 23/10 | (2006.01) |

(52) U.S. Cl.
CPC .............. C08F 10/06 (2013.01); C08L 23/12 (2013.01); C08L 23/10 (2013.01); C08L 2205/02 (2013.01); C08L 2205/025 (2013.01); C08L 2314/02 (2013.01)

(58) Field of Classification Search
CPC .......... C08F 10/06; C08L 23/12; C08L 23/10; C08L 2314/02; C08L 2205/02; C08L 2205/025
USPC ......................................................... 526/65
See application file for complete search history.

(56) References Cited

U.S. PATENT DOCUMENTS

2009/0018267 A1* 1/2009 Vestberg .............. C08F 110/06
525/52

FOREIGN PATENT DOCUMENTS

| EP | 0361493 B1 | 11/1994 |
| EP | 0728769 B1 | 8/1998 |
| EP | 0887379 A1 | 12/1998 |
| EP | 0887380 B1 | 2/2004 |
| EP | 0887381 B1 | 11/2005 |
| EP | 0991684 B1 | 1/2006 |
| WO | 9212182 A1 | 7/1992 |
| WO | 9924478 A1 | 5/1999 |
| WO | 9924479 A1 | 5/1999 |
| WO | 0068315 A1 | 11/2000 |
| WO | 2004000899 A1 | 12/2003 |
| WO | 2004111095 A1 | 12/2004 |
| WO | WO-2007003523 A1 | 11/2007 |
| WO | WO-2008124212 A1 | 10/2008 |
| WO | WO-2009077467 A1 | 6/2009 |
| WO | 2010089123 A1 | 8/2010 |
| WO | 2011076611 A1 | 6/2011 |
| WO | WO-2011000557 A1 | 6/2011 |
| WO | 2011117103 A1 | 9/2011 |

OTHER PUBLICATIONS

Busico, Vincenzo, et al., "Full Assignment of the 13C NMR Spectra of Regioregular Polypropylenes: Methyl and Methylene Region", Macromolecules 1997, 30, 6251-6263.
Busico, Vincenzo, et al., "Microstructure of Polypropylene", Prog. Polym. Sci 26 (2001) 443-533.
Busico, Vincenzo, et al., "Alk-1-Ene Polymerization in the Presence of a Monocyclopentadienyl Zirconium(IV) Acetamidinate Catalyst: Microstructural and Mechanistic Insights", Macromol. Rapid Commun. 2007, 28, 1128-1134.
Cheng, H.N., "13C NMR Analysis of Ethylene-Propylene Rubbers", Macromolecules 1984, 17, 1950-1955.
Resconi, Luigi, et al., "Selectivity in Propene Polymerization With Metallocene Catalysts", Chem. Rev. 2000, 100, 1253-1345.
Wang, Wen-Jun, et al., "Structural Analysis of Ethylene/Propylene Copolymers Synthesized With a Constrained Geometry Catalyst", Macromolecules 2000, 33, 1157-1162.
Zhou, Zhe, et al., "A New Decoupling Method for Accurate Quantification of Polyethylene Copolymer Composition and Triad Sequence Distribution With 13C NMR", Journal of Magnetic Resonance 187 (2007) 225-233.
Zweifel, Plastic Additive Handbook, 2001, pp. 871-874.

* cited by examiner

*Primary Examiner* — William Cheung
(74) *Attorney, Agent, or Firm* — Tarolli, Sundheim, Covell & Tummino LLP

(57) ABSTRACT

Polypropylene having a melt flow rate $MFR_2$ (230° C.) of at least 20 g/10 min; and a $M_w/M_n$ ratio of at least 15.0.

16 Claims, No Drawings

POLYPROPYLENE WITH EXTREME BROAD MOLECULAR WEIGHT DISTRIBUTION

This application is a national stage application under 35 USC 371 of PCT Application No. PCT/EP2014/062017 having an international filing date of Jun. 10, 2014, which is designated in the United States and which claimed the benefit of EP Patent Application No. 13172871.9 filed on Jun. 19, 2013, the entire disclosures each are hereby incorporated by reference in their entirety.

The present invention is directed to a new polypropylene with very broad molecular weight distribution and its manufacture.

Polypropylene is used in many applications. Depending on its end applications the properties of the polypropylene must be tailored accordingly. For instance for some end applications very high stiffness and flowability are required.

WO 2011076611 A1 describes a heterophasic system. However the product has low flowability and moderate stiffness.

WO 2010/089123 A1 defines a polypropylene material with a melt flow rate $MFR_2$ (230° C.) up 12 g/10 min. The molecular weight distribution (Mw/Mn) does not exceed 8.

WO 2011/117103 describes a propylene copolymer with rather low stiffness. The melt flow rate is very low.

Accordingly there is still the demand to provide polypropylene material with exceptional high stiffness paired with high flowability.

The finding of the present invention is to provide a polypropylene with a melt flow rate $MFR_2$ (230° C.) of at least 20 g/10 min and a broad molecular weight distribution, i.e. a ratio of weight average molecular weight (Mw) to number average molecular weight (Mn) [Mw/Mn] of at least at least 15.0 and/or a ratio of the complexviscosity eta*(0.05 rad/sec)/eta*(300 rad/sec) of at least 20.0.

Accordingly in a first embodiment the present invention is directed to a polypropylene having (a) a melt flow rate $MFR_2$ (230° C.) measured according to ISO 1133 of at least 20 g/10 min; and
(b) a ratio of weight average molecular weight (Mw) to number average molecular weight (Mn) [Mw/Mn] of at least 15.0.

Preferably said polypropylene has a polydispersity index (PI) of at least 10.0 and/or a ratio of the complex viscosity eta*(0.05 rad/sec)/eta*(300 rad/sec) of at least 20.0.

In a second embodiment the present invention is directed to a polypropylene having (a) a melt flow rate $MFR_2$ (230° C.) measured according to ISO 1133 of at least 20 g/10 min; and
(b) a ratio of the complex viscosity eta*(0.05 rad/sec)/eta*(300 rad/sec) of at least 20.0.

Preferably said polypropylene has a ratio of weight average molecular weight (Mw) to number average molecular weight (Mn) [Mw/Mn] of at least 15.0 and/or a polydispersity index (PI) of at least 10.0.

Preferably the polypropylene according to the first and second embodiment is a propylene homopolymer.

Preferably the xylene cold soluble content (XCS) determined according ISO 16152 (25° C.) of the polypropylene according to the first and second embodiment is at least 2.8 wt.-%.

In one specific aspect of the present invention, the polypropylene of the first and second embodiment is α-nucleated.

It has been found that the polypropylene according to this invention is featured by exceptional high stiffness by keeping the melt flow rate melt flow rate $MFR_2$ (230° C.) on a high level.

In the following the invention, i.e. the first and second embodiment, will be described in more detail together.

One requirement of the polypropylene according to this invention is its rather high melt flow rate. Accordingly the polypropylene has an $MFR_2$ (230° C.) measured according to ISO 1133 of at least 20 g/10 min, in the range of 20 to 500 g/10 min, more preferably in the range of 30 to 300 g/10 min, still more preferably in the range of 40 to 200 g/10 min.

Another requirement for the polypropylene is its broad molecular weight distribution. One way of defining the broad molecular weight distribution is to determine the molecular weight by the Gel Permeation Chromatography (GPC). The number average molecular weight (Mn) is an average molecular weight of a polymer expressed as the first moment of a plot of the number of molecules in each molecular weight range against the molecular weight. In effect, this is the total molecular weight of all molecules divided by the number of molecules. The number average molecular weight (Mn) is very sensitive to changes in the weight fractions of low molecular weight species. In turn, the weight average molecular weight (Mw) is the first moment of a plot of the weight of polymer in each molecular weight range against molecular weight. The weight average molecular weight (Mw) is very sensitive to changes in number of large molecules in a given sample of a polymer. Finally the z-average molecular weight (Mz) gives information about the very high molecular weight species of the polymer.

Accordingly the polypropylene according to this invention has a ratio of weight average molecular weight (Mw) to number average molecular weight (Mn) [Mw/Mn] of at least 15.0, preferably in the range of 17.0 to 35.0, more preferably in the range of 18.0 to 32.0, still more preferably in the range of 19.0 to 30.0.

Additionally it is preferred that the polypropylene has a ratio of z-average molecular weight (Mz) to weight average molecular weight (Mw) [Mz/Mw] of at least 9.0, more preferably of 9.0 to 15.0, still more preferably in the range of 9.0 to 14.0, yet more preferably in the range of 9.2 to 13.5.

Additionally or alternatively to the previous paragraph the polypropylene has a ratio of z-average molecular weight (Mz) to number average molecular weight (Mn) [Mz/Mn] at least 150, more preferably in the range of 150 to 500, still more preferably in the range of 170 to 400.

Alternatively or additionally to the Gel Permeation Chromatography (GPC) method, the polypropylene can be defined by its rheological behaviour. Thus it is appreciated that the polypropylene has a ratio of the complex viscosity eta*(0.05 rad/sec)/eta*(300 rad/sec) measured by dynamic rheology according to ISO 6271-10 at 200° C. of at least 20.0, preferably of at least 25.0, still more preferably in the range of 20.0 to 60.0, yet more preferably in the range of 25.0 to 50.0.

Alternatively or additionally the polypropylene has a polydispersity index (PI), defined as $10^5/G_c$ with $G_c$ being the crossover modulus as defined in the example section, of at least 10.0, more preferably of at least 20.0, yet more preferably in the range of 10.0 to 50.0, still more preferably in the range of 20.0 to 45.0, like in the range of 22.0 to 40.0.

The polypropylene according to this invention can be a propylene copolymer or a propylene homopolymer, the latter is especially preferred.

According to the present invention the expression "polypropylene homopolymer" relates to a polypropylene that consists substantially, i.e. of at least 99.0 wt.-%, more preferably of at least 99.5 wt.-%, yet more preferably of at least of 99.8 wt.-%, propylene units. In another embodiment only propylene units are detectable, i.e. the propylene homopolymer has been obtained by polymerizing only propylene.

In case the polypropylene is a propylene copolymer it is appreciated that the propylene copolymer comprises monomers copolymerizable with propylene, for example comonomers such as ethylene and/or $C_4$ to $C_{12}$ α-olefins, in particular ethylene and/or $C_4$ to $C_8$ α-olefins, e.g. 1-butene and/or 1-hexene. Preferably the propylene copolymer according to this invention comprises, especially consists of, monomers copolymerizable with propylene from the group consisting of ethylene, 1-butene and 1-hexene. More specifically the propylene copolymer of this invention comprises—apart from propylene—units derivable from ethylene and/or 1-butene. In a preferred embodiment the propylene copolymer comprises units derivable from ethylene and propylene only.

Additionally it is appreciated that the propylene copolymer has preferably a comonomer content in the range of more than 0.2 to 3.0 wt.-%, more preferably in the range of more than 0.5 to 2.0 wt.-%, yet more preferably in the range of 0.5 to 1.0 wt.-%.

It is preferred that the polypropylene, like the propylene homopolymer, according to this invention is featured by rather high cold xylene soluble (XCS) content, i.e. by a xylene cold soluble (XCS) of at least 2.5 wt.-%, like at least 2.8 wt.-%. Accordingly the polypropylene, like the propylene homopolymer, has preferably a xylene cold soluble content (XCS) in the range of 2.5 to 5.5 wt.-%, more preferably in the range of 2.8 to 5.0 wt.-%, still more preferably in the range of 3.5 to 5.0 wt.-%.

The amount of xylene cold solubles (XCS) additionally indicates that the polypropylene, like the propylene homopolymer, is preferably free of any elastomeric polymer component, like an ethylene propylene rubber. In other words, the polypropylene, like the propylene homopolymer, shall be not a heterophasic polypropylene, i.e. a system consisting of a polypropylene matrix in which an elastomeric phase is dispersed. Such systems are featured by a rather high xylene cold soluble content. However the polypropylene, like the propylene homopolymer, according to this invention is very suitable to act as the matrix in a heterophasic system.

As mentioned above, the polypropylene, like the propylene homopolymer, preferably does not contain elastomeric (co)polymers forming inclusions as a second phase for improving mechanical properties. The presence of second phases or the so called inclusions are for instance visible by high resolution microscopy, like electron microscopy or atomic force microscopy, or by dynamic mechanical thermal analysis (DMTA). Specifically in DMTA the presence of a multiphase structure can be identified by the presence of at least two distinct glass transition temperatures.

Accordingly it is preferred that the polypropylene, like the propylene homopolymer, according to this invention has no glass transition temperature below −30° C., preferably below −25° C., more preferably below −20° C.

On the other hand, in one preferred embodiment the polypropylene, like the propylene homopolymer, according to this invention has a glass transition temperature in the range of −15 to 0° C., more preferably in the range of −12 to −2° C. These values apply in particular in case the polypropylene, like the propylene homopolymer, is α-nucleated.

Further, the polypropylene is preferably a crystalline. The term "crystalline" indicates that the polypropylene has a rather high melting temperature. Accordingly throughout the invention the polypropylene is regarded as crystalline unless otherwise indicated. Therefore the polypropylene preferably has a melting temperature of more than 160° C., i.e. of more than 160 to 168° C., more preferably of at least 161° C., i.e. in the range of 162 to 168° C., still more preferably in the range of 163 to 167° C.

Preferably the polypropylene is isotactic. Accordingly it is preferred that the polypropylene has a rather high pentad concentration (mmmm %) i.e. more than 94.5 mol-%, more preferably at least 95.0 mol %, still more preferably more than 94.5 to 97.0 mol-%, yet more preferably in the range of 95.0 to 97.0 mol-%.

A further characteristic of the polypropylene is the low amount of misinsertions of propylene within the polymer chain, which indicates that the polypropylene is produced in the presence of a Ziegler-Natta catalyst, preferably in the presence of a Ziegler-Natta catalyst (ZN-C) as defined in more detail below. Accordingly the polypropylene is preferably featured by low amount of 2,1 erythro regio-defects, i.e. of equal or below 0.4 mol.-%, more preferably of equal or below than 0.2 mol.-%, like of not more than 0.1 mol.-%, determined by $^{13}$C-NMR spectroscopy. In an especially preferred embodiment no 2,1 erythro regio-defects are detectable.

Due to the low amounts of regio-defects the polypropylene is additionally characterized by a high content of thick lamella. The specific combination of rather moderate mmmm pentad concentration and low amount of regio-defects has also impact on the crystallization behaviour of the polypropylene. Thus, the polypropylene of the instant invention is featured by long crystallisable sequences and thus by a rather high amount of thick lamellae. To identify such thick lamellae the stepwise isothermal segregation technique (SIST) is the method of choice. Therefore, the polypropylene can be additionally or alternatively defined by the weight ratio of the crystalline fractions melting in the temperature range of above 160 to 180° C. to the crystalline fractions melting in the temperature range of 90 to 160 [(>160-180)/(90-160)].

Thus it is preferred that the weight ratio of the crystalline fractions melting in the temperature range of above 160 to 180° C. to the crystalline fractions melting in the temperature range of 90 to 160 [(>160-180)/(90-160)] of the polypropylene is at least 3.20, more preferably in the range of 3.30 to 4.10, still more preferably in the range of 3.40 to 4.00, wherein said fractions are determined by the stepwise isothermal segregation technique (SIST). The values are especially applicable in case the polypropylene is α-nucleated.

Preferably that the crystallization temperature of the polypropylene is at least 116° C., more preferably at least 125° C., still more preferably in the range of 116 to 137° C., like in the range of 125 to 134° C. The values are especially applicable in case the polypropylene is α-nucleated.

The polypropylene is further featured by very high stiffness. Accordingly it is preferred that the tensile modulus of the polypropylene is at least 2,250 MPa, more preferably at least 2,400 MPa, still more preferably in the range of 2,250 to 2,800 MPa, like in the range of 2,400 to 2,700 MPa. The values are especially applicable in case the polypropylene is α-nucleated.

The polypropylene according to this invention preferably comprises, more preferably consists of, three fractions, namely a first polypropylene fraction (PP1), a second polypropylene fraction (PP2) and a third polypropylene fraction (PP3). Preferably at least one, more preferably at least two, of the three polypropylene fractions (PP1), (PP2) and (PP3) are propylene homopolymer fractions. In an especially preferred embodiment all three polypropylene fractions (PP1), (PP2) and (PP3) are propylene homopolymer fractions. Thus in one embodiment the polypropylene comprises, preferably consists of, three fractions, namely a first propylene homopolymer fraction (H-PP1), a second propylene homopolymer fraction (H-PP2) and a third propylene homopolymer fraction (H-PP3). Thus if in the following reference is made to polypropylene fractions (PP1), (PP2) and (PP3) in a preferred embodiment propylene homopolymer fractions (H-PP1), (H-PP2) and (HH-P3) are meant.

In case the polypropylene is a propylene copolymer at least one of the three polypropylene fractions (PP1), (PP2) and (PP3) is a propylene copolymer fraction. In one embodiment the three polypropylene fractions (PP1), (PP2) and (PP3) of the propylene copolymer are propylene copolymer fractions (R-PP1), (R-PP2) and (R-PP3).

The comonomer content shall be rather low for each of the propylene copolymer fractions (R-PP1), (PP2), and (PP3). Accordingly the comonomer content of each of the three polypropylene fractions (PP1), (PP2), and (PP3) is not more than 1.0 wt.-%, yet more preferably not more than 0.8 wt.-%, still more preferably not more than 0.5 wt.-%. In case of the propylene copolymer fractions (R-PP1), (R-PP2), and (R-PP3) it is appreciated that the comonomer content for each of the propylene copolymer fractions (R-PP1), (R-PP2), and (R-PP3) is in the range of more than 0.2 to 3.0 wt.-%, more preferably in the range of more than 0.2 to 2.5 wt.-%, yet more preferably in the range of 0.2 to 2.0 wt.-%.

Concerning the comonomers used in the first propylene copolymer fraction (R-PP1), the second propylene copolymer fraction (R-PP2), and the third propylene copolymer fraction (R-PP3) it is referred to the information provided for the propylene copolymer. Accordingly the (R-PP1), (R-PP2), and (R-PP3) comprise independently from each other monomers copolymerizable with propylene, for example comonomers such as ethylene and/or $C_4$ to $C_{12}$ α-olefins, in particular ethylene and/or $C_4$ to $C_8$ α-olefins, e.g. 1-butene and/or 1-hexene. Preferably (R-PP1), (R-PP2), and (R-PP3) comprise independently from each other, especially consists independently from each other of, monomers copolymerizable with propylene from the group consisting of ethylene, 1-butene and 1-hexene. More specifically the (R-PP1), (R-PP2) and (R-PP3) comprise independently from each other—apart from propylene—units derivable from ethylene and/or 1-butene. In a preferred embodiment the (R-PP1), (R-PP2) and (R-PP3) have apart from propylene the same comonomers. Thus in an especially preferred embodiment the (R-PP1), (R-PP2) and (R-PP3) comprise units derivable from ethylene and propylene only.

Thus in a preferred embodiment the polypropylene comprises
(a) a first polypropylene fraction (PP1) being a first propylene homopolymer fraction (H-PP1) or a first propylene copolymer fraction (R-PP1),
(b) a second polypropylene fraction (PP2) being a second propylene homopolymer fraction (H-PP2) or a second propylene copolymer fraction (R-PP2),
(c) a third polypropylene fraction (PP3) being a third propylene homopolymer fraction (H-PP3) or a third propylene copolymer fraction (R-PP3), preferably with the proviso that at least one of the three fractions PP1, PP2, and PP3 is a propylene homopolymer, preferably at least the first polypropylene fraction (PP1) is a propylene homopolymer fraction (H-PP1), more preferably all three fractions (PP1), (PP2), and (PP3) are propylene homopolymer fractions (H-PP1), (H-PP2) and (H-PP3).

Preferably the weight ratio between the first polypropylene fraction (PP1) and the second polypropylene fraction (PP2) is 70:30 to 40:60, more preferably 65:35 to 45:55.

Preferably the weight ratio between the second polypropylene fraction (PP2) and the third polypropylene fraction (PP3) is 97.5:2.5 to 50:50, more preferably 90:10 to 70:30.

Thus it is especially preferred that the polypropylene comprises, preferably consist of,
a) the first polypropylene fraction (PP1), like the first propylene homopolymer fraction (H-PP1), in the range of 40 to 60 wt.-%, more preferably in the range of 45 to 60 wt.-%, yet more preferably in the range of 50 to 60 wt.-%,
b) the second polypropylene fraction (PP2), like the second propylene homopolymer fraction (H-PP2), in the range of 25 to 59.0 wt.-%, more preferably in the range of 27 to 52 wt.-%, yet more preferably in the range of 28 to 45.5 wt.-%, and
c) the third polypropylene fraction (PP3), like the third propylene homopolymer fraction (H-PP3), in the range of 1.0 to 15.0 wt.-%, more preferably in the range of 3.0 to 13.0 wt.-%, yet more preferably in the range of 4.5 to 12.0 wt.-%, based on the total amount of the polypropylene, preferably based on the total amount of the first polypropylene fraction (PP1), the second polypropylene fraction (PP2), and the third polypropylene fraction (PP3) together.

Preferably the first polypropylene fraction (PP1), the second polypropylene fraction (PP2), and the third polypropylene fraction (PP3) differ in the melt flow rate $MFR_2$ (230° C.), more preferably differ in the melt flow rate $MFR_2$ (230° C.) by at least 30 g/10 min, yet more preferably by at least 35 g/10 min.

Preferably the first polypropylene fraction (PP1) has a higher melt flow rate $MFR_2$ (230° C.) than the second polypropylene fraction (PP2) and the second polypropylene fraction (PP2) has a higher melt flow rate $MFR_2$ (230° C.) than the third polypropylene fraction (PP3).

Accordingly it is especially preferred that
(a) the melt flow rate $MFR_2$ (230° C.) of the first polypropylene fraction (PP1) is at least 5 times higher, preferably at least 6 times higher, more preferably 5 times to 50 times higher, still more preferably 6 times to 20 times higher, than the melt flow rate $MFR_2$ (230° C.) of second polypropylene fraction (PP2);
and/or
(b) the melt flow rate $MFR_2$ (230° C.) of the second polypropylene fraction (PP2) is at least 5,000 times higher, preferably at least 10,000 times higher, more preferably 5,000 times to 5,000,000 times higher, still more preferably 10,000 times to 500,000 times higher, than the melt flow rate $MFR_2$ (230° C.) of third polypropylene fraction (PP3).

Thus in one specific embodiment the polypropylene according to the present invention comprises, preferably consists of, the first polypropylene fraction (PP1), the second polypropylene fraction (PP2) and the third polypropylene fraction (PP3) wherein
(a) the melt flow rate $MFR_2$ (230° C.) of the first polypropylene fraction (PP1) is at least 200 g/10 min, more preferably in the range of 200 to 2,000 g/10 min, still more preferably in the range of 300 to 1,500 g/10 min, like in the range of 400 to 1,000 g/10 min;

and/or (b) the melt flow rate MFR$_2$ (230° C.) of the second polypropylene fraction (PP2) is in the range of 10 to below 200 g/10 min, more preferably in the range of 20 to 150 g/10 min, like in the range of 30 to 100 g/10 min;

and/or (c) the melt flow rate MFR$_2$ (230° C.) of the third polypropylene fraction (PP3) is below 0.1 g/10 min, more preferably in the range of 0.000001 to below 0.1 g/10 min, still more preferably in the range of 0.00001 to 0.1 g/10 min, like in the range of 0.00001 to 0.05 g/10 min.

Thus it is preferred that the first polypropylene fraction (PP1) and the second polypropylene fraction (PP2) fulfill together the inequation (I), more preferably inequation (Ia), $$50.0 \geq \frac{MFR\ (PP1)}{MFR\ (PP2)} \geq 5.0 \qquad (I)$$

$$20.0 \geq \frac{MFR\ (PP1)}{MFR\ (PP2)} \geq 6.0 \qquad (Ia)$$

wherein

MFR (PP1) is the melt flow rate MFR$_2$ (230° C.) [g/10 min] of the first polypropylene fraction (PP1), MFR (PP2) is the melt flow rate MFR$_2$ (230° C.) [g/10 min] of the second polypropylene fraction (PP2).

Additionally or alternatively it is preferred that the second propylene homopolymer fraction (H-PP2) and the third propylene homopolymer fraction (H-PP3) fulfill together the inequation (II), more preferably inequation (IIa), $$5 \times 10^6 \geq \frac{MFR\ (PP2)}{MFR\ (PP3)} \geq 5,000 \qquad (II)$$

$$5 \times 10^5 \geq \frac{MFR\ (PP2)}{MFR\ (PP3)} \geq 10,000 \qquad (IIa)$$

wherein

MFR (PP2) is the melt flow rate MFR$_2$ (230° C.) [g/10 min] of the second polypropylene fraction (PP2), MFR (PP3) is the melt flow rate MFR$_2$ (230° C.) [g/10 min] of the third polypropylene fraction (PP3).

Additionally or alternatively it is preferred that the first polypropylene fraction (PP1) and the polypropylene fulfill together the inequation (III), more preferably inequation (IIIa), still more preferably inequation (IIIb), $$40.0 \geq \frac{MFR\ (PP1)}{MFR\ (PP)} \geq 4.0 \qquad (III)$$

$$30.0 \geq \frac{MFR\ (PP1)}{MFR\ (PP)} \geq 5.0 \qquad (IIIa)$$

$$20.0 \geq \frac{MFR\ (PP1)}{MFR\ (PP)} \geq 5.5 \qquad (IIIb)$$

wherein

MFR (PP1) is the melt flow rate MFR$_2$ (230° C.) [g/10 min] of the first polypropylene fraction (PP1), MFR (PP) is the melt flow rate MFR$_2$ (230° C.) [g/10 min] of the polypropylene.

Preferably the polypropylene according to this invention is produced as defined in more detail below.

Preferably the first polypropylene fraction (PP1) is produced in the first polymerization reactor (R1) and optionally in the prepolymerisation reactor, whereas the second polypropylene fraction (PP2) is produced in the second polymerization reactor (R2). The third polypropylene fraction (PP3) is preferably produced in the third polymerization reactor (R3).

The polypropylene as defined in the instant invention may contain up to 5.0 wt.-% additives (except the α-nucleating agent as defined in detail below), like antioxidants, slip agents and antiblocking agents. Preferably the additive content is below 3.0 wt.-%, like below 1.0 wt.-%.

As mentioned above in one preferred embodiment the polypropylene comprises at least one α-nucleating agent.

In case the polypropylene comprises at least one α-nucleating agent, it is further preferred that it is free of β-nucleating agents. The α-nucleating agents are preferably selected from the group consisting of (i) salts of monocarboxylic acids and polycarboxylic acids, e.g. sodium benzoate or aluminum tert-butylbenzoate, and (ii) dibenzylidenesorbitol (e.g. 1,3:2,4 dibenzylidenesorbitol) and $C_1$-$C_8$-alkyl-substituted dibenzylidenesorbitol derivatives, such as methyldibenzylidenesorbitol, ethyldibenzylidenesorbitol or dimethyldibenzylidenesorbitol (e.g. 1,3:2,4 di(methylbenzylidene) sorbitol), or substituted nonitol-derivatives, such as 1,2,3,-trideoxy-4,6:5,7-bis-O-[(4-propylphenyl)methylene]-nonitol, and (iii) salts of diesters of phosphoric acid, e.g. sodium 2,2'-methylenebis(4, 6,-di-tert-butylphenyl) phosphate or aluminium-hydroxy-bis[2,2'-methylene-bis(4,6-di-t-butylphenyl)phosphate], and (iv) vinylcycloalkane polymer and vinylalkane polymer, like polyvinylcyclohexane (pVCH) (as discussed in more detail below), and (v) mixtures thereof.

Such additives are generally commercially available and are described, for example, in "Plastic Additives Handbook", pages 871 to 873, 5th edition, 2001 of Hans Zweifel.

Preferably the polypropylene contains up to 5 wt.-% of α-nucleating agents. In a preferred embodiment, the polypropylene contains not more than 200 ppm, more preferably of 1 to 200 ppm, more preferably of 5 to 100 ppm of a α-nucleating agent, in particular selected from the group consisting of dibenzylidenesorbitol (e.g. 1,3:2,4 dibenzylidene sorbitol), dibenzylidenesorbitol derivative, preferably dimethyldibenzylidenesorbitol (e.g. 1,3:2,4 di(methylbenzylidene) sorbitol), or substituted nonitol-derivatives, such as 1,2,3,-trideoxy-4,6:5,7-bis-O-[(4-propylphenyl) methylene]-nonitol, sodium 2,2'-methylenebis(4, 6,-di-tert-butylphenyl) phosphate, vinylcycloalkane polymer, like polyvinylcyclohexane (pVCH), vinylalkane polymer, and mixtures thereof.

In one preferred embodiment the polypropylene contains as the sole α-nucleating agent vinylcycloalkane polymer, like polyvinylcyclohexane (pVCH). In another preferred embodiment the polypropylene contains as the sole α-nucleating agent sodium 2,2'-methylenebis(4, 6,-di-tert-butylphenyl) phosphate. In one still further preferred embodiment the polypropylene contains as the sole α-nucleating agents vinylcycloalkane polymer, like polyvinylcyclohexane (pVCH) and sodium 2,2'-methylenebis(4, 6,-di-tert-butylphenyl) phosphate.

In the following the manufacture of the polypropylene is described in more detail.

The polypropylene according to this invention is produced in a sequential polymerization system comprising a pre-polymerization reactor (PR) and at least three polymerization reactors (R1), (R2) and (R3) connected in series, wherein the polymerization in the at least three polymerization reactors (R1), (R2) and (R3) takes place in the presence of a Ziegler-Natta catalyst (ZN-C), said Ziegler-Natta catalyst (ZN-C) comprises (a) a pro-catalyst (PC) comprising a titanium compound (TC) having at least one titanium-halogen bond, and an internal donor (ID), both supported on a magnesium halide,
(b) a co-catalyst (Co), and
(c) an external donor (ED), wherein (i) the internal donor (ID) comprises at least 80 wt.-% of a compound selected from the group consisting of a succinate, citraconate, a di-ketone and an enamino-imine, preferably 80 wt.-% of a succinate;
(ii) the mol-ratio of co-catalyst (Co) to external donor (ED) [Co/ED] of said Ziegler-Natta catalyst (ZN-C) is below 20, and
(iii) said Ziegler-Natta catalyst (ZN-C) is present in the pre-polymerization reactor (PR) and propylene ($C_3$) and optionally hydrogen ($H_2$) is fed to said pre-polymerization reactor (PR) in a $H_2/C_3$ feed ratio of 0.00 to 0.10 mol/kmol.

The process according the present invention comprises a pre-polymerization step in a pre-polymerization reactor (PR). Subsequent thereto, the (main) polymerization takes place in the at least three reactors (R1, R2 and R3). Accordingly all reactors, i.e. the pre-polymerization reactor (PR) and the other reactors arranged downstream to the pre-polymerization reactor (PR), i.e. the at least three reactors (R1, R2 and R3), are connected in series.

The term "pre-polymerization" as well as the term "pre-polymerization reactor (PR)" indicates that this is not the main polymerization in which the polypropylene of the present invention is produced. In turn in the "at least three reactors (R1, R2 and R3)" takes the main polymerization place, i.e. the polypropylene of the instant invention is produced. Accordingly in the pre-polymerization reactor (PR), i.e. in the pre-polymerization step, propylene of low amounts is polymerized to the polypropylene (Pre-PP). Typically the weight ratio of the polypropylene (Pre-PP) produced in pre-polymerization reactor (PR) and the titanium compound (TC) of the Ziegler-Natta catalyst (ZN-C) is below 100 kg Pre-PP/g TC, more preferably in the range of 1 to 100 kg pre-PP/g TC, still more preferably in the range of 5 to 80 Pre-PP/g TC, yet more preferably in the range of 10 to 50 kg Pre-PP/g TC.

Further the weight average molecular weight ($M_w$) of the polypropylene (Pre-PP) produced in the pre-polymerization reactor (PR) is rather high. Thus it is preferred that the polypropylene (Pre-PP) produced in the pre-polymerization reactor (PR) has weight average molecular weight ($M_w$) of at least 600,000 g/mol, more preferably of at least 1,600,000 g/mol. In preferred embodiments the weight average molecular weight ($M_w$) of the polypropylene (Pre-PP) produced in the pre-polymerization reactor (PR) is in the range of 600,000 to 20,000,000 g/mol, more preferably in the range of 1,600,000 to 16,000,000 g/mol, even more preferably in the range of 3,000,000 to 11,000,000 g/mol.

One aspect of the present process is that a specific ratio of hydrogen ($H_2$) and propylene ($C_3$) feed into the pre-polymerization reactor (PR) must be used. Accordingly the hydrogen is fed to the pre-polymerization reactor (PR) in addition to propylene in a $H_2/C_3$ feed ratio of 0.00 to 0.10 mol/kmol, preferably of 0.00 to 0.08 mol/kmol, more preferably of 0.00 to 0.04 mol/kmol, still more preferably of 0.00 to 0.02 mol/kmol. Preferably this feed ratio is used to accomplish a preferred $H_2$/C3 ratio in the pre-polymerization reactor (PR). It is preferred that the $H_2$/C3 ratio in the pre-polymerization reactor (PR) is of 0.00 to 0.12 mol/kmol, preferably of 0.00 to 0.10 mol/kmol, more preferably of 0.00 to 0.05 mol/kmol, still more preferably of 0.00 to 0.02 mol/kmol.

The pre-polymerization reaction is preferably conducted at rather high operating temperature, i.e. an operating temperature of more than 20 to 80° C., preferably from 30 to 75° C., and more preferably from 40 to 70° C., like from 40 to 65° C.

The pressure in the pre-polymerization reactor is not critical but must be sufficiently high to maintain the reaction mixture in liquid phase. Thus, the pressure may be from 10 to 100 bar, for example 15 to 70 bar.

The average residence time ($\tau$) is defined as the ratio of the reaction volume ($V_R$) to the volumetric outflow rate from the reactor ($Q_o$) (i.e. $V_R/Q_o$), i.e $\tau=V_R/Q_o$ [tau=$V_R/Q_o$]. In case of a loop reactor the reaction volume ($V_R$) equals to the reactor volume.

The average residence time ($\tau$) in the pre-polymerization reactor (PR) is preferably in the range of 3 to 20 min, still more preferably in the range of more than 4 to 15 min, like in the range of 5 to 12 min.

In a preferred embodiment, the pre-polymerization is conducted as bulk slurry polymerization in liquid propylene, i.e. the liquid phase mainly comprises propylene, with optionally inert components dissolved therein. Furthermore, according to the present invention, a hydrogen ($H_2$) feed can be employed during pre-polymerization as mentioned above.

As mentioned above the pre-polymerization is conducted in the presence of the Ziegler-Natta catalyst (ZN-C). Accordingly all the components of the Ziegler-Natta catalyst (ZN-C), i.e. the pro-catalyst (PC), the co-catalyst (Co), and the external donor (ED), are all introduced to the pre-polymerization step. However, this shall not exclude the option that at a later stage for instance further co-catalyst (Co) is added in the polymerization process, for instance in the first reactor (R1). In a preferred embodiment the pro-catalyst (PC), the co-catalyst (Co), and the external donor (ED) are only added in the pre-polymerization reactor (PR).

It is possible to add other components also to the pre-polymerization stage. Thus, antistatic additive may be used to prevent the particles from adhering to each other or to the walls of the reactor.

The precise control of the pre-polymerization conditions and reaction parameters is within the skill of the art.

Subsequent to the pre-polymerization, the mixture (MI) of the Ziegler-Natta catalyst (ZN-C) and the polypropylene (Pre-PP) produced in the pre-polymerization reactor (PR) is transferred to the first reactor (R1). Typically the total amount of the polypropylene (Pre-PP) in the final polypropylene (PP) is rather low and typically not more than 5.0 wt.-%, more preferably not more than 4.0 wt.-%, still more preferably in the range of 0.1 to 4.0 wt-%, like in the range 0.2 of to 3.0 wt.-%.

One further requirement of the present invention is that the process for the (main) preparation of polypropylene (PP) comprises a sequential polymerization process comprising at least three polymerization reactors (R1, R2 and R3). In one embodiment, the sequential polymerization process consists of three polymerization reactors (R1, R2 and R3).

The term "sequential polymerization process" indicates that the polypropylene is produced in at least three reactors connected in series. Accordingly the present process preferably comprises at least a first polymerization reactor (R1), a second polymerization reactor (R2), and a third polymerization reactor (R3). The term "polymerization reactor" shall indicate that the main polymerization takes place. That means the expression "polymerization reactor" does not include the pre-polymerization reactor employed according to the present invention. Thus, in case the process "consists of" three polymerization reactors, this definition does by no means exclude that the overall process comprises the pre-polymerization step in a pre-polymerization reactor. The term "consist of" is only a closing formulation in view of the main polymerization reactors.

Accordingly, in the at least three polymerization reactors (R1, R2, and R3), likely in the three polymerization reactors (R1, R2, and R3), the polypropylene is produced. Thus the polypropylene according to this invention preferably comprises at least three fractions ((PP1), (PP2) and (PP3)), more preferably consists of three fractions ((PP1), (PP2) and (PP3)). Preferably these fractions differ in the molecular weight and thus in the melt flow rate (see above). The term "consist of" with regard to the polypropylene fractions (PP1), (PP2) and (PP3) shall not exclude the option that the final polypropylene is additivated. The term "consist of" shall only indicate that the polypropylene shall not contain further polypropylene fractions obtained by the polymerization process. Thus, if for instance, the polypropylene consists of the three polypropylene fractions (PP1), (PP2) and (PP3) than the polypropylene consists of the polypropylene (Pre-PP) (see discussion below the three polypropylene fractions (PP1), (PP2) and (PP3) and optional additives. Of course the additives may be also polymers, as it is for instance the case for α-nucleating agents, or the additives contain polymer carriers. In any case if the polypropylene consists of the polypropylene fractions (PP1), (PP2) and (PP3) nor further polymer in an amount exceeding 5 wt.-% shall be present.

In addition to the fractions defined in the previous paragraph the polypropylene comprises also low amounts of the polypropylene (Pre-PP) as defined above. According to this invention the polypropylene (Pre-PP) obtained in the pre-polmyerization step is preferably regarded to be part of the first polypropylene fraction (PP1). Accordingly the properties defined for the first polypropylene fraction (PP1) in the present invention are in fact the combination of the polypropylene (Pre-PP) produced in the pre-polymerization reactor and the polypropylene produced in the first polymerization reactor (R1).

The first polymerization reactor (R1) is preferably a slurry reactor (SR) and can be any continuous or simple stirred batch tank reactor or loop reactor operating in bulk or slurry. Bulk means a polymerization in a reaction medium that comprises of at least 60% (w/w) monomer. According to the present invention the slurry reactor (SR) is preferably a (bulk) loop reactor (LR).

Preferably the polypropylene, i.e. the first polypropylene fraction (PP1) of the polypropylene, of the first polymerization reactor (R1), more preferably polymer slurry of the loop reactor (LR) containing the first polypropylene fraction (PP1) of the polypropylene, is directly fed into the second polymerization reactor (R2), e.g. into a first gas phase reactor (GPR-1), without a flash step between the stages. This kind of direct feed is described in EP 887379 A, EP 887380 A, EP 887381 A and EP 991684 A. By "direct feed" is meant a process wherein the content of the first polymerization reactor (R1), i.e. of the loop reactor (LR), the polymer slurry comprising the first polypropylene fraction (PP1) of the polypropylene, is led directly to the next stage gas phase reactor.

Alternatively, the polypropylene, i.e. the first polypropylene fraction (PP1) of the polypropylene, of the first polymerization reactor (R1), more preferably polymer slurry of the loop reactor (LR) containing the first polypropylene fraction (PP1) of the polypropylene, may be also directed into a flash step or through a further concentration step before fed into the second polymerization reactor (R2), e.g. into the first gas phase reactor (GPR-1). Accordingly, this "indirect feed" refers to a process wherein the content of the first polymerization reactor (R1), of the loop reactor (LR), i.e. the polymer slurry, is fed into the second polymerization reactor (R2), e.g. into the first gas phase reactor (GPR-1), via a reaction medium separation unit and the reaction medium as a gas from the separation unit.

A gas phase reactor (GPR) according to this invention is preferably a fluidized bed reactor, a fast fluidized bed reactor or a settled bed reactor or any combination thereof.

More specifically, the second polymerization reactor (R2), the third polymerization reactor (R3) and any subsequent polymerization reactor, if present, are preferably gas phase reactors (GPRs). Such gas phase reactors (GPR) can be any mechanically mixed or fluid bed reactors. Preferably the gas phase reactors (GPRs) comprise a mechanically agitated fluid bed reactor with gas velocities of at least 0.2 m/sec. Thus it is appreciated that the gas phase reactor is a fluidized bed type reactor preferably with a mechanical stirrer.

Thus in a preferred embodiment the first polymerization reactor (R1) is a slurry reactor (SR), like loop reactor (LR), whereas the second polymerization reactor (R2), the third polymerization reactor (R3) and any optional subsequent polymerization reactor are gas phase reactors (GPR). Accordingly for the instant process at least three, preferably three polymerization reactors, namely a slurry reactor (SR), like a loop reactor (LR), a first gas phase reactor (GPR-1), and a second gas phase reactor (GPR-2) connected in series are used. Prior to the slurry reactor (SR) a pre-polymerization reactor is placed according to the present invention.

As mentioned above, the Ziegler-Natta catalyst (ZN-C), is fed into the pre-polymerization reactor (PR) and is subsequently transferred with the polypropylene (Pre-PP) obtained in pre-polymerization reactor (PR) into the first polymerization reactor (R1).

A preferred multistage process is a "loop-gas phase"-process, such as developed by Borealis A/S, Denmark (known as BORSTAR® technology) described e.g. in patent literature, such as in EP 0 887 379, WO 92/12182 WO 2004/000899, WO 2004/111095, WO 99/24478, WO 99/24479 or in WO 00/68315.

A further suitable slurry-gas phase process is the Spheripol® process of Basell.

It is preferred that the operating temperature of the first polymerization reactor (R1), i.e. of the loop reactor (LR), is lower than the operating temperature of the second and third polymerization reactors (R2 and R3), i.e. of the first and second gas phase reactors (GPR1 and GPR2). Preferably the operating temperature difference is in the range of 2 to 15° C., more preferably in the range of 3 to 10° C.

Accordingly it is preferred that the operating temperature in the first polymerization reactor (R1), i.e. in the loop reactor (LR), is in the range of 50 to 130° C., more preferably in the range of 60 to 100° C., still more preferably in the range of 65 to 90° C., yet more preferably in the range of 70 to 90° C., like in the range of 70 to 80° C.

On the other hand the operating temperature of the second and third polymerization reactors (R2 and R3), i.e. of the first and second gas phase reactors (GPR1 and GPR2), is in the range of 60 to 100° C., more preferably in the range of 70 to 95° C., still more preferably in the range of 75 to 90° C., yet more preferably in the range of 78 to 85° C.

Typically the pressure in the first polymerization reactor (R1), preferably in the loop reactor (LR), is in the range of from 28 to 80 bar, preferably 32 to 60 bar, whereas the pressure in the second polymerization reactor (R2), i.e. in the first gas phase reactor (GPR-1), and in the third polymerization reactor (R3), i.e. in the second gas phase reactor (GPR-2), and in any subsequent polymerization reactor, if present, is in the range of from 5 to 50 bar, preferably 15 to 35 bar.

Preferably hydrogen is added in each polymerization reactor in order to control the molecular weight, i.e. the melt flow rate $MFR_2$.

Accordingly it is preferred that the hydrogen to propylene feed ratio $[H_2/C_3]$ to the first polymerization reactor (R1) is in the range of 10 to 60 mol/kmol, more preferably in the range of 15 to 50 mol/kmol, and/or the hydrogen to propylene feed ratio $[H_2/C_3]$ to the second polymerization reactor (R2) is in the range of 10 to 260 mol/kmol, more preferably in the range of 15 to 180 mol/kmol. In turn the hydrogen to propylene feed ratio $[H_2/C_3]$ to the third polymerization reactor (R) is in the range of 0 to 20 mol/kmol, more preferably in the range of 0 to 5.0 mol/kmol. It is especially preferred that the hydrogen and propylene feed are constant over the polymerization time. Preferably the feed ratios are used to accomplish a preferred $H_2/C3$ ratio in the first polymerization reactor (R1), the second polymerization reactor (R2) and third polymerization reactor (R3), respectively.

The average residence time (τ) in the first polymerization reactor (R1) is preferably at least 20 min, more preferably in the range of 20 to 60 min, still more preferably in the range of 20 to 40 min, like in the range of 20 to 35 min, and/or the average residence time (τ) in the second polymerization reactor (R2) is preferably at least 30 min, more preferably in the range of 30 to 120 min, still more preferably in the range of 35 to 100 min, yet more preferably in the range of 40 to 80 min. Preferably the average residence time (τ) in the third polymerization reactor (R3) is at least 80 min, more preferably in the range of 80 to 250 min, still more preferably in the range of 100 to 245 min.

Further it is preferred that the total average residence time (τ) in the three polymerization reactors (R1), (R2) and (R3) is at most 700 min, more preferably in the range of 150 to 700 min, still more preferably in the range of 170 to 500 min, more preferably in the range of 200 to 400 min, still more preferably in the range of 240 to 380 min.

Accordingly the process according to the instant invention preferably comprises the following steps under the conditions set out above (a) in the pre-polymerization reactor (PR) propylene is reacted in the presence of the Ziegler-Natta catalyst (ZN-C) comprising the pro-catalyst (PC), the external donor (ED) and the co-catalyst (Co), obtaining thereby a mixture (MI) of the produced polypropylene (Pre-PP) and the used Ziegler-Natta catalyst (ZN-C), (b) transferring said mixture (MI) comprising the Ziegler-Natta catalyst (ZN-C) and the polypropylene (Pre-PP) in the first polymerization reactor (R1), preferably in the loop reactor (LR), (c) in the first polymerization reactor (R1), preferably in the loop reactor (LR), propylene and optionally at least one other α-olefin, like optionally a $C_2$ to $C_{10}$ α-olefin other than propylene, is/are polymerized in the presence of the Ziegler-Natta catalyst (ZN-C) obtaining a first polypropylene fraction (PP1) of the polypropylene, (d) transferring said first polypropylene fraction (PP1) to the second polymerization reactor (R2), preferably to the first gas phase reactor (GPR-1), (e) in the second polymerization reactor (R2), preferably in the first gas phase reactor (GPR-1), propylene and optionally at least one other α-olefin, like optionally a $C_2$ to $C_{10}$ α-olefin other than propylene, is/are polymerized in the presence of the first polypropylene fraction (PP1) obtaining a second polypropylene fraction (PP2) of the polypropylene, said first polypropylene fraction (PP1) and said second polypropylene fraction (PP2) form a mixture (M), (f) transferring said mixture (M) to the third polymerization reactor (R3), preferably to the second gas phase reactor (GPR-2), and (g) in the third polymerization reactor (R3), preferably in the second gas phase reactor (GPR-2), propylene and optionally at least one other α-olefin, like optionally a C2 to $C_{10}$ α-olefin other than propylene, is/are polymerized in the presence of the mixture (M) obtaining a third polypropylene fraction (PP3) of the polypropylene, said mixture (M) and said third polypropylene fraction (PP3) form the polypropylene.

According to a specific aspect the process according to the instant invention preferably comprises the following steps under the conditions set out above (a) in the pre-polymerization reactor (PR) propylene is reacted in the presence of the Ziegler-Natta catalyst (ZN-C) comprising the pro-catalyst (PC), the external donor (ED) and the co-catalyst (Co), obtaining thereby a mixture (MI) of the produced polypropylene (Pre-PP) and the used Ziegler-Natta catalyst (ZN-C), (b) transferring said mixture (MI) comprising the Ziegler-Natta catalyst (ZN-C) and the polypropylene (Pre-PP) in the first polymerization reactor (R1), preferably in the loop reactor (LR), (c) in the first polymerization reactor (R1), preferably in the loop reactor (LR), propylene is polymerized in the presence of the Ziegler-Natta catalyst (ZN-C) obtaining a first propylene homopolymer fraction (H-PP1) of the propylene homopolymer (H-PP), (d) transferring said first polypropylene fraction (H-PP1) to the second polymerization reactor (R2), preferably to the first gas phase reactor (GPR-1), (e) in the second polymerization reactor (R2), preferably in the first gas phase reactor (GPR-1), propylene is polymerized in the presence of the first propylene homopolymer fraction (H-PP1) obtaining a second propylene homopolymer fraction (H-PP2) of the propylene homopolymer (H-PP), said first propylene homopolymer fraction (H-PP1) and said second propylene homopolymer fraction (H-PP2) form a mixture (M), (f) transferring said mixture (M) to the third polymerization reactor (R3), preferably to the second gas phase reactor (GPR-2), and (g) in the third polymerization reactor (R3), preferably in the second gas phase reactor (GPR-2), propylene is polymerized in the presence of the mixture (M) obtaining a third propylene homopolymer fraction (H-PP3) of the propylene homopolymer (H-PP), said mixture (M) and said third propylene homopolymer fraction (H-PP3) form the propylene homopolymer (H-PP).

Due to the transfer of the first polypropylene fraction (PP1) and the mixture (M), respectively automatically also the Ziegler-Natta catalyst (ZN-C) is transferred in the next reactors.

After the polymerization the polypropylene is discharged and mixed with additives as mentioned above.

Ziegler-Natta Catalyst CZN-C)

As mentioned above in the process for the preparation of the polypropylene as defined above a Ziegler-Natta catalyst (ZN-C) must be used. Accordingly the Ziegler-Natta catalyst (ZN-C) will be now described in more detail.

The Ziegler-Natta catalyst (ZN-C) comprises pro-catalyst (PC) comprising a titanium compound (TC), which has at least one titanium-halogen bond, and an internal donor (ID), both supported on magnesium halide, preferably in active form.

The internal donor (ID) used in the present invention comprises a compound selected from the group consisting of a succinate, citraconate, a di-ketone and an enamino-imine. The internal donoer (ID) may also comprise a mixture of two or three of the compounds selected from the group consisting of succinate, citraconate, di-ketone and enamino-imine. Further the internal donor (ID) may comprise additional compounds to those mentioned before, like phthalate or di-ether. Accordingly in one embodiment the internal donor (ID) consists of a compound selected from the group consisting of succinate, citraconate, di-ketone, enamino-imine and mixture thereof. In another embodiment the internal donor (ID) consists of a succinate and a phthalate or consists of a succinate and a diether. The preferred internal donor (ID) is a succinate or a mixture of a succinate and a phthalate. It is especially preferred that the internal donor (ID) is a succinate only.

Accordingly it is preferred that the internal donor (ID) comprises a compound selected from the group consisting of succinate, citraconate, di-ketone, enamino-imine, and mixtures thereof, preferably comprise a succinate, of at least 80 wt.-%, more preferably at least 90 wt.-%, still more preferably at least 95 wt.-% and even more preferably at least 99 wt.-%, of the total weight of the internal donor (ID). It is, however, preferred that the internal donor (ID) essentially consists, e.g. is, a compound selected from the group consisting of succinate, citraconate, di-ketone, enamino-imine, and mixtures thereof, preferably is a succinate.

The pro-catalyst (PC) comprising a succinate, a di-ketone or an enamino-imine as internal donor (ID) can for example be obtained by reaction of an anhydrous magnesium halide with an alcohol, followed by titanation with a titanium halide and reaction with the respective succinate, citraconate, di-ketone or enamino-imine compound as internal donor (ID). Such a catalyst comprises about 1.5 to 6 wt % of titanium, about 10 to 20 wt.-% of magnesium and about 5 to 30 wt.-% of internal donor (ID) with chlorine and solvent making up the remainder.

Suitable succinates have the formula

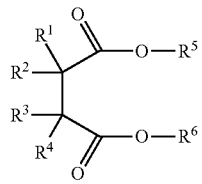

wherein $R^1$ to $R^4$ are equal to or different from one another and are hydrogen, or a $C_1$ to $C_{20}$ linear or branched alkyl, alkenyl, cycloalkyl, aryl, arylalkyl or alkylaryl group, optionally containing heteroatoms, and $R^1$ to $R^4$, being joined to the same carbon atom, can be linked together to form a cycle; and $R^5$ and $R^6$ are equal to or different from one another and are a linear or branched alkyl, alkenyl, cycloalkyl, aryl, arylalkyl or alkylaryl group, optionally containing heteroatoms.

Suitable di-ketones are 1,3-di-ketones of formula

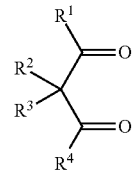

wherein $R^2$ and $R^3$ are equal to or different from one another and are hydrogen, or a C1 to $C_{20}$ linear or branched alkyl, alkenyl, cycloalkyl, aryl, arylalkyl or alkylaryl group, optionally containing heteroatoms, and $R^2$ and $R^3$, being joined to the same carbon atom, can be linked together to form a cycle; and $R^1$ and $R^4$ are equal to or different from one another and are a linear or branched alkyl, alkenyl, cycloalkyl, aryl, arylalkyl or alkylaryl group, optionally containing heteroatoms.

Suitable enamino-imines have the general formula

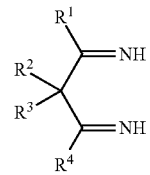

wherein $R^2$ and $R^3$ are equal to or different from one another and are hydrogen, or a $C_1$ to $C_{20}$ linear or branched alkyl, alkenyl, cycloalkyl, aryl, arylalkyl or alkylaryl group, optionally containing heteroatoms, and $R^2$ and $R^3$, being joined to the same carbon atom, can be linked together to form a cycle; and $R^1$ and $R^4$ are equal to or different from one another and are a linear or branched alkyl, alkenyl, cycloalkyl, aryl, arylalkyl or alkylaryl group, optionally containing heteroatoms.

Suitable diethers are 1,3-diethers of formula $$R^1R^2C(CH_2OR^3)(CH_2OR^4)$$

wherein $R^1$ and $R^2$ are the same or different and are $C_1$ to $C_{18}$ alkyl, $C_3$-$C_{18}$ cycloalkyl or C7 to $C_{18}$ aryl radicals or H atoms; $R^3$ and W are the same or different and are $C_1$ to $C_4$ alkyl radicals; or are the 1,3-diethers in which the carbon atom in position 2 belongs to a cyclic or polycyclic structure made up of 5, 6 or 7 carbon atoms and containing two or three unsaturations. Ethers of this type are disclosed in published European patent applications EP-A-0 361 493 and EP-A-0 728 769. Representative examples of said diethers are 2-methyl-2-isopropyl-1,3-dimethoxypropane; 2,2-diisobutyl-1,3-dimethoxypropane; 2-isopropyl-2-cyclopentyl-1,3-dimethoxypropane; 2-isopropyl-2-isoamyl-1,3-dimethoxypropane; 9,9-bis(methoxymethyl)fluorene.

Suitable phthalates are selected from the alkyl, cycloalkyl and aryl phthalates, such as for example diethyl phthalate, diisobutyl phthalate, di-n-butyl phthalate, dioctyl phthalate, diphenyl phthalate and benzylbutyl phthalate.

Pro-catalysts (PC) comprising a succinate, a diether, a phthalate etc. as internal donor (ID) are commercially available for example from Basell under the Avant ZN trade name. One particularly preferred Ziegler-Natta catalyst (ZN-C) is the catalyst ZN168M of Basell.

As further component in the instant polymerization process an external donor (ED) must be present. Suitable external donors (ED) include certain silanes, ethers, esters, amines, ketones, heterocyclic compounds and blends of these. It is especially preferred to use a silane. It is most preferred to use silanes of the general formula $$R^a_p R^b_q Si(OR^c)_{(4-p-q)}$$

wherein $R^a$, $R^b$ and $R^c$ denote a hydrocarbon radical, in particular an alkyl or cycloalkyl group, and wherein p and q are numbers ranging from 0 to 3 with their sum p+q being equal to or less than 3. $R^a$, $R^b$ and $R^c$ can be chosen independently from one another and can be the same or different.

Accordingly a preferred external donor (ED) is represented by the formula $$Si(OCH_3)_2 R^5_2$$

wherein $R^5$ represents a branched-alkyl group having 3 to 12 carbon atoms, preferably a branched-alkyl group having 3 to 6 carbon atoms, or a cyclo-alkyl having 4 to 12 carbon atoms, preferably a cyclo-alkyl having 5 to 8 carbon atoms.

It is in particular preferred that $R^5$ is selected from the group consisting of iso-propyl, iso-butyl, iso-pentyl, tert.-butyl, tert.-amyl, neopentyl, cyclopentyl, cyclohexyl, methylcyclopentyl and cycloheptyl.

Another preferred external donor (ED) is represented by the formula $$Si(OCH_2CH_3)_3(NR^xR^y)$$

wherein $R^x$ and $R^y$ can be the same or different a represent a hydrocarbon group having 1 to 12 carbon atoms.

$R^x$ and $R^y$ are independently selected from the group consisting of linear aliphatic hydrocarbon group having 1 to 12 carbon atoms, branched aliphatic hydrocarbon group having 1 to 12 carbon atoms and cyclic aliphatic hydrocarbon group having 1 to 12 carbon atoms. It is in particular preferred that $R^x$ and $R^y$ are independently selected from the group consisting of methyl, ethyl, n-propyl, n-butyl, octyl, decanyl, iso-propyl, iso-butyl, iso-pentyl, tert.-butyl, tert.-amyl, neopentyl, cyclopentyl, cyclohexyl, methylcyclopentyl and cycloheptyl.

More preferably both $R^x$ and $R^y$ are the same, yet more preferably both $R^x$ and $R^y$ are an ethyl group.

Specific examples of such silanes are (tert-butyl)$_2$Si (OCH$_3$)$_2$, cylohexyl methyl dimethoxy silan (cyclohexyl) (methyl)Si(OCH$_3$)$_2$ (referred to as "C donor"), (phenyl)$_2$Si (OCH$_3$)$_2$, dicyclopentyl dimethoxy silane (cyclopentyl)$_2$Si (OCH$_3$)$_2$ (referred to as "D donor") and diethylaminotriethoxysilane (CH$_3$CH$_2$)$_2$NSi(OCH$_2$CH$_3$)$_3$ (referred to as U-donor).

The co-catalyst is preferably a compound of group 13 of the periodic table (IUPAC), e.g. organo aluminum, such as an aluminum compound, like aluminum alkyl, aluminum halide or aluminum alkyl halide compound. Accordingly in one specific embodiment the co-catalyst (Co) is a trialkyl-aluminium, like triethylaluminium (TEAL), dialkyl aluminium chloride or alkyl aluminium sesquichloride. In one specific embodiment the co-catalyst (Co) is triethylaluminium (TEAL).

Advantageously, the trialkylaluminium, like triethylaluminium (TEAL), has a hydride content, expressed as AlH$_3$, of less than 1.0 wt % with respect to the trialkylaluminium, like the triethylaluminium (TEAL). More preferably, the hydride content is less than 0.5 wt %, and most preferably the hydride content is less than 0.1 wt %.

To obtain best the desired polypropylene of the present invention the ratio between on the one hand of co-catalyst (Co) and the external donor (ED) [Co/ED] and on the other hand of the co-catalyst (Co) and the titanium compound (TC) [Co/TC] should be carefully chosen.

Accordingly the mol-ratio of co-catalyst (Co) to external donor (ED) [Co/ED] must be below 20, preferably in the range of 0.5 to below 20, more preferably is in the range of 1.0 to 10, still more preferably is in the range of 1.0 to 5.0, yet more preferably is in the range of 1.5 to 2.5.

Preferably the mol-ratio of co-catalyst (Co) to titanium compound (TC) [Co/TC] is at most 130, more preferably in the range of 10 to 100, still more preferably is in the range of 20 to 80, yet more preferably is in the range of 30 to 70, still yet more preferably is in the range of 40 to 60.

Alternatively or additionally to the Co/TC-requirement it is preferred that the molar-ratio of external donor (ED) to titanium compound [ED/TC] is below 50, more preferably in the range of more than 5 to below 50, still more preferably in the range of 10 to 40, yet more preferably in the range of 15 to 30.

In the following the present invention is further illustrated by means of examples.

EXAMPLES

A. Measuring Methods

The following definitions of terms and determination methods apply for the above general description of the invention including the claims as well as to the below examples unless otherwise defined.

Quantification of Microstructure by NMR Spectroscopy

Quantitative nuclear-magnetic resonance (NMR) spectroscopy was used to quantify the isotacticity and regio-regularity of the polypropylene homopolymers.

Quantitative $^{13}$C {$^1$H} NMR spectra were recorded in the solution-state using a Bruker Advance III 400 NMR spectrometer operating at 400.15 and 100.62 MHz for $^1$H and $^{13}$C respectively. All spectra were recorded using a $^{13}$C optimised 10 mm extended temperature probehead at 125° C. using nitrogen gas for all pneumatics.

For polypropylene homopolymers approximately 200 mg of material was dissolved in 1,2-tetrachloroethane-d$_2$ (TCE-d$_2$). To ensure a homogenous solution, after initial sample preparation in a heat block, the NMR tube was further heated in a rotataory oven for at least 1 hour. Upon insertion into the magnet the tube was spun at 10 Hz. This setup was chosen primarily for the high resolution needed for tacticity distribution quantification (Busico, V., Cipullo, R., Prog. Polym. Sci. 26 (2001) 443; Busico, V.; Cipullo, R., Monaco, G., Vacatello, M., Segre, A. L., Macromolecules 30 (1997) 6251). Standard single-pulse excitation was employed utilising the NOE and bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 11289). A total of 8192 (8k) transients were acquired per spectra.

Quantitative $^{13}C\{^{1}H\}$ NMR spectra were processed, integrated and relevant quantitative properties determined from the integrals using proprietary computer programs.

For polypropylene homopolymers all chemical shifts are internally referenced to the methyl isotactic pentad (mmmm) at 21.85 ppm.

Characteristic signals corresponding to regio defects (Resconi, L., Cavallo, L., Fait, A., Piemontesi, F., Chem. Rev. 2000, 100, 1253; Wang, W-J., Zhu, S., Macromolecules 33 (2000), 1157; Cheng, H. N., Macromolecules 17 (1984), 1950) or co-monomer were observed.

The tacticity distribution was quantified through integration of the methyl region between 23.6-19.7 ppm correcting for any sites not related to the stereo sequences of interest (Busico, V., Cipullo, R., Prog. Polym. Sci. 26 (2001) 443; Busico, V., Cipullo, R., Monaco, G., Vacatello, M., Segre, A. L., Macromolecules 30 (1997) 6251).

Specifically the influence of regio-defects and co-monomer on the quantification of the tacticity distribution was corrected for by subtraction of representative regio-defect and co-monomer integrals from the specific integral regions of the stereo sequences.

The isotacticity was determined at the pentad level and reported as the percentage of isotactic pentad (mmmm) sequences with respect to all pentad sequences:

[mmmm]%=100*(mmmm/sum of all pentads)

The presence of 2,1 erythro regio-defects was indicated by the presence of the two methyl sites at 17.7 and 17.2 ppm and confirmed by other characteristic sites. Characteristic signals corresponding to other types of regio-defects were not observed (Resconi, L., Cavallo, L., Fait, A., Piemontesi, F., Chem. Rev. 2000, 100, 1253).

The amount of 2,1 erythro regio-defects was quantified using the average integral of the two characteristic methyl sites at 17.7 and 17.2 ppm:

$P_{21e} = (I_{e6} + I_{e8})/2$

The amount of 1,2 primary inserted propene was quantified based on the methyl region with correction undertaken for sites included in this region not related to primary insertion and for primary insertion sites excluded from this region:

$P_{12} = I_{CH3} + P_{12e}$

The total amount of propene was quantified as the sum of primary inserted propene and all other present regio-defects:

$P_{total} = P_{12} + P_{21e}$

The mole percent of 2,1 erythro regio-defects was quantified with respect to all propene:

[21e] mol.-%=100*($P_{21e}/P_{total}$)

Characteristic signals corresponding to the incorporation of ethylene were observed (as described in Cheng, H. N., Macromolecules 1984, 17, 1950) and the co-monomer fraction calculated as the fraction of ethylene in the polymer with respect to all monomer in the polymer.

The comonomer fraction was quantified using the method of W-J. Wang and S. Zhu, Macromolecules 2000, 33 1157, through integration of multiple signals across the whole spectral region in the $^{13}C\{^{1}H\}$ spectra. This method was chosen for its robust nature and ability to account for the presence of regio-defects when needed. Integral regions were slightly adjusted to increase applicability across the whole range of encountered co-monomer contents.

The mole percent co-monomer incorporation was calculated from the mole fraction. The weight percent co-monomer incorporation was calculated from the mole fraction.

Calculation of co-monomer content of the second propylene copolymer fraction (R-PP2):

$$\frac{C(PP) - w(PP1) \times C(PP1)}{w(PP2)} = C(PP2) \quad (I)$$

wherein w(PP1) is the weight fraction [in wt.-%] of the first propylene copolymer fraction (R-PP1), w(PP2) is the weight fraction [in wt.-%] of the second propylene copolymer fraction (R-PP2), C(PP1) is the co-monomer content [in wt-%] of the first propylene copolymer fraction (R-PP1), C(PP) is the co-monomer content [in wt-%] of the polypropylene obtained after the second polymerization reactor (R2), i.e. of the mixture of the first polypropylene fraction (PP1) and second polypropylene fraction (PP2), C(PP2) is the calculated co-monomer content [in wt-%] of the second propylene copolymer fraction (R-PP2).

Calculation of co-monomer content of the third propylene copolymer fraction (R-PP3):

$$\frac{C(PP) - w(PP1/2) \times C(PP1/2)}{w(PP3)} = C(PP3) \quad (I)$$

wherein w(PP1/2) is the weight fraction [in wt.-%] of the mixture of first propylene copolymer fraction (R-PP1) and second propylene copolymer fraction (R-PP2), w(PP3) is the weight fraction [in wt.-%] of the third propylene copolymer fraction (R-PP3), C(PP1/2) is the co-monomer content [in mol-%] of the mixture of first propylene copolymer fraction (R-PP1) and second propylene copolymer fraction (R-PP2), C(PP) is the co-monomer content [in wt-%] of the propylene copolymer, C(PP3) is the calculated co-monomer content [in wt-%] of the third propylene copolymer fraction (R-PP3).

Calculation of melt flow rate $MFR_2$ (230° C.) of the second propylene homo-polymer fraction (PP2):

$$MFR(PP2) = 10^{\left[\frac{\log(MFR(PP1/2)) - w(PP1) \times \log(MFR(PP1))}{w(PP2)}\right]} \quad (I)$$

wherein w(PP1) is the weight fraction [in wt.-%] of the first polypropylene fraction (PP1), w(PP2) is the weight fraction [in wt-%] of the second polypropylene fraction (PP2), MFR(PP1) is the melt flow rate $MFR_2$ (230° C.) [in g/10 min] of the first polypropylene fraction (PP1), MFR(PP1/2) is the melt flow rate $MFR_2$ (230° C.) [in g/10 min] of the polypropylene obtained after the second polymerization reactor (R2), i.e. of the mixture of the first polypropylene fraction (PP1) and second polypropylene fraction (PP2), MFR(PP2) is the calculated melt flow rate $MFR_2$ (230° C.) [in g/10 min] of the second polypropylene fraction (PP2).

Calculation of melt flow rate MFR$_2$ (230° C.) of the third polypropylene fraction (PP3):

$$MFR(PP3) = 10^{\left[\frac{\log(MFR(PP))-w(PP1/2)\times\log(MFR(PP1/2))}{w(PP3)}\right]} \quad (II)$$

wherein
w(PP1/2) is the weight fraction [in wt.-%] of the polypropylene obtained after the second polymerization reactor (R2), i.e. of the mixture of the first polypropylene fraction (PP1) and second polypropylene fraction (PP2),
w(PP3) is the weight fraction [in wt.-%] of the third polypropylene fraction (PP3),
MFR(PP1/2) is the melt flow rate MFR$_2$ (230° C.) [in g/10 min] of the polypropylene obtained after the second polymerization reactor (R2), i.e. of the mixture of the first polypropylene fraction (PP1) and second polypropylene fraction (PP2),
MFR(PP) is the melt flow rate MFR$_2$ (230° C.) [in g/10 min] of the polypropylene,
MFR(PP3) is the calculated melt flow rate MFR$_2$ (230° C.) [in g/10 min] of the third polypropylene fraction (PP3).
MFR$_2$ (230° C.) is measured according to ISO 1133 (230° C., 2.16 kg load)

Number Average Molecular Weight ($M_n$), Weight Average Molecular Weight ($M_w$), z-Average Molecular Weight ($M_z$)

Molecular weight averages Mw, Mn and Mz were determined by Gel Permeation Chromatography (GPC) according to ISO 16014-4:2003 and ASTM D 6474-99. A PolymerChar GPC instrument, equipped with infrared (IR) detector was used with 3× Olexis and 1× Olexis Guard columns from Polymer Laboratories and 1,2,4-trichlorobenzene (TCB, stabilized with 250 mg/L 2,6-Di tert butyl-4-methyl-phenol) as solvent at 160° C. and at a constant flow rate of 1 mL/min. 200 μL of sample solution were injected per analysis. The column set was calibrated using universal calibration (according to ISO 16014-2:2003) with at least 15 narrow MWD polystyrene (PS) standards in the range of 0.5 kg/mol to 11 500 kg/mol. Mark Houwink constants for PS, PE and PP used are as described per ASTM D 6474-99. All samples were prepared by dissolving 5.0-9.0 mg of polymer in 8 mL (at 160° C.) of stabilized TCB (same as mobile phase) for 2.5 hours for PP or 3 hours for PE at max. 160° C. under continuous gentley shaking in the autosampler of the GPC instrument.

The Xylene Soluble Fraction at Room Temperature (XS, Wt.-%): The amount of the polymer soluble in xylene is determined at 25° C. according to ISO 16152; first edition; 2005-07-01.

Rheology: Dynamic rheological measurements were carried out with Rheometrics RDA-II QC on compression moulded samples under nitrogen atmosphere at 230° C. using 25 mm-diameter plate and plate geometry. The oscillatory shear experiments were done within the linear viscoelastic range of strain at frequencies from 0.015 to 300 rad/s (ISO 6721-10). The values of storage modulus (G'), loss modulus (G"), complex modulus (G*) and complex viscosity ($\eta^*$) were obtained as a function of frequency ($\omega$).

The Zero shear viscosity ($\eta_0$) was calculated using complex fluidity defined as the reciprocal of complex viscosity. Its real and imaginary part are thus defined by $$f'(\omega)=\eta'(\omega)/[\eta'(\omega)^2+\eta''(\omega)^2] \text{ and}$$

$$f'(\omega)=\eta''(\omega)/[\eta'(\omega)^2+\eta''(\omega)^2]$$

The complex viscosity ratio eta*(0.05 rad/sec)/eta*(300 rad/sec) is the ratio of the complex viscosity ($\eta^*$) at 0.05 rad/sec to the complex viscosity ($\eta^*$) at 300 rad/sec.

The Polydispersity Index, PI,

PI=$10^5/G_c$, is calculated from the cross-over point of G'($\omega$) and G"($\omega$), for which G'($\omega_c$)=G"($\omega_c$)=$G_c$ holds.

DSC Analysis, Melting Temperature ($T_m$) and Heat of Fusion ($H_f$), Crystallization Temperature ($T_c$) and Heat of Crystallization ($H_c$): measured with a TA Instrument Q2000 differential scanning calorimetry (DSC) on 5 to 7 mg samples. DSC is run according to ISO 11357/part 3/method C2 in a heat/cool/heat cycle with a scan rate of 10° C./min in the temperature range of −30 to +225° C. Crystallization temperature and heat of crystallization ($H_c$) are determined from the cooling step, while melting temperature and heat of fusion ($H_f$) are determined from the second heating step.

The glass transition temperature Tg is determined by dynamic mechanical analysis according to ISO 6721-7. The measurements are done in torsion mode on compression moulded samples (40×10×1 mm$^3$) between −100° C. and +150° C. with a heating rate of 2° C./min and a frequency of 1 Hz.

Tensile Test: The tensile test (modulus, strength and tensile strain at break) is measured at 23° C. according to ISO 527-1 (cross head speed 1 mm/min) using injection moulded specimens according to ISO 527-2(1B), produced according to EN ISO 1873-2 (dog 10 bone shape, 4 mm thickness, moulded at 180° C. or at 200° C.).

Stepwise Isothermal Segregation Technique (SIST)

The isothermal crystallisation for SIST analysis was performed in a Mettler TA820 DSC on 3±0.5 mg samples at decreasing temperatures between 200° C. and 105° C.
(i) the samples were melted at 225° C. for 5 min.,
(ii) then cooled with 80° C./min to 145° C.
(iii) held for 2 hours at 145° C.,
(iv) then cooled with 80° C./min to 135° C.
(v) held for 2 hours at 135° C.,
(vi) then cooled with 80° C./min to 125° C.
(vii) held for 2 hours at 125° C.,
(viii) then cooled with 80° C./min to 115° C.
(ix) held for 2 hours at 115° C.,
(x) then cooled with 80° C./min to 105° C.
(xi) held for 2 hours at 105° C.

After the last step the sample was cooled down with 80° C./min to −10° C. and the melting curve was obtained by heating the cooled sample at a heating rate of 10° C./min up to 200° C. All measurements were performed in a nitrogen atmosphere. The melt enthalpy is recorded as function of temperature and evaluated through measuring the melt enthalpy of fractions melting within temperature intervals of 50 to 60° C.; 60 to 70° C.; 70 to 80° C.; 80 to 90° C.; 90 to 100° C.; 100 to 110° C.; 110 to 120° C.; 120 to 130° C.; 130 to 140° C.; 140 to 150° C.; 150 to 160° C.; 160 to 170° C.; 170 to 180° C.; 180 to 190° C.; 190 to 200° C.

B. Examples

The catalyst used in the polymerization process for the polypropylene of the inventive examples (IE1 to IE5) and the comparative example CE7 was the commercial Ziegler-Natta catalyst ZN168M catalyst (succinate as internal donor, 2.5 wt.-% Ti) from Lyondell-Basell prepolymerised with vinylcyclohexane (VCH; before used in the poylmerisation process) used along with triethyl-aluminium (TEAL) as co-catalyst and dicyclo pentyl dimethoxy silane (D-donor) and diethylaminotriethoxysilane ($CH_3CH_2$)$_2$NSi($OCH_2CH_3$)$_3$ (referred to as U-donor), respectively, as external donor (see table 1). The catalyst used in the polymerization process for the polypropylene of the comparative examples (CE1 to CE6) was the commercial Ziegler-Natta catalyst ZN168M catalyst (succinate as internal donor, 2.5 wt.-% Ti) from Lyondell-Basell not prepolymerised with vinylcyclohexane (before used in the polymerisation process) used along with triethyl-aluminium (TEAL) as co-catalyst and dicyclopentyl dimethoxysilane (D-donor) as external donor (see table 1).

The aluminium to donor ratio, the aluminium to titanium ratio and the polymerization conditions are indicated in table 1.

TABLE 1 a: Preparation of inventive propylene homopolymers

|  |  | IE1 | IE2 | IE3 | IE4 | IE5 |
|---|---|---|---|---|---|---|
| Donor |  | D | D | D + U* | D + U* | D + U* |
| TEAL/Ti | [mol/mol] | 50 | 50 | 50 | 50 | 50 |
| TEAL/Donor | [mol/mol] | 2 | 2 | 2 | 2 | 2 |
| Donor/Ti | [mol/mol] | 25 | 25 | 25 | 25 | 25 |
| Pre-polymerization |  |  |  |  |  |  |
| temp | [° C.] | 45 | 45 | 45 | 45 | 65 |
| time | [min] | 6 | 6 | 6 | 6 | 8 |
| H2/C3 ratio | [mol/kmol] | 0.009 | 0.009 | 0.010 | 0.010 | 0 |
| LOOP |  |  |  |  |  |  |
| time | [min] | 25 | 25 | 25 | 25 | 30 |
| temp | [° C.] | 75 | 75 | 75 | 75 | 75 |
| split | [wt.-%] | 52.2 | 54.4 | 53 | 52.9 | 57.9 |
| MFR$_2$ | [g/10'] | 537 | 537 | 632 | 632 | n.a. |
| H2/C3 | [mol/kmol] | 37.0 | 36.9 | 37.5 | 37.3 | 35.9 |
| pressure | [bar] | 32 | 32 | 32 | 32 | 32 |
| activity | [kg PP/g cat × h] | 58.5 | 59.7 | 54.3 | 51.8 | 51.0 |
| GPR1 |  |  |  |  |  |  |
| time | [min] | 70 | 74 | 47 | 51 | 61 |
| temp | [° C.] | 80 | 80 | 80 | 80 | 80 |
| split | [wt.-%] | 34.8 | 35.3 | 34.1 | 34.3 | 30.1 |
| MFR$_2$ | [g/10'] | 85.4 | 85.4 | 42.4 | 60.0 | n.a. |
| H2/C3 | mol/kmol | 66.1 | 66.1 | 37.7 | 49.4 | 54.7 |
| pressure | [bar] | 32 | 32 | 32 | 32 | 32 |
| activity | [kg PP/g cat × h] | 14.1 | 12.5 | 18.6 | 16.4 | 14.0 |
| GPR2 |  |  |  |  |  |  |
| time | [min] | 242 | 179 | 167 | 167 | 190 |
| temp | [° C.] | 80 | 80 | 80 | 80 | 70 |
| split | [wt.-%] | 13.0 | 10.3 | 12.9 | 12.8 | 12.0 |
| MFR$_2$ | [g/10'] × 10$^{-4}$ | 21 | 11 | 8 | 59 | n.a |
| H2/C3 | mol/kmol | 1.91 | 1.90 | 0.85 | 1.03 | 1.17 |
| pressure | [bar] | 32 | 32 | 32 | 32 | 32 |
| activity | [kg PP/g cat × h] | 1.5 | 1.5 | 2.0 | 2.0 | 1.7 | b: Preparation of comparative propylene homopolymers

|  |  | CE1 | CE2 | CE3 | CE4 | CE5 | CE6 | CE7 |
|---|---|---|---|---|---|---|---|---|
| Donor |  | D | D | D | D | D | D + U* | D |
| TEAL/Ti | [mol/mol] | 250 | 250 | 250 | 250 | 250 | 250 | 250 |
| TEAL/Donor | [mol/mol] | 5 | 5 | 5 | 5 | 5 | 5 | 5 |
| Donor/Ti | [mol/mol] | 50 | 50 | 50 | 50 | 50 | 50 | 50 |
| Pre-polymerization |  |  |  |  |  |  |  |  |
| temp | [° C.] | 20 | 20 | 20 | 20 | 20 | 20 | 20 |
| time | [min] | 6 | 6 | 6 | 6 | 6 | 6 | 6 |
| H2/C3 ratio | [mol/kmol] | 0.22 | 0.22 | 0.22 | 0.22 | 0.22 | 0.22 | 0.22 |
| LOOP |  |  |  |  |  |  |  |  |
| time | [min] | 25 | 25 | 25 | 25 | 25 | 25 | 25 |
| temp | [° C.] | 80 | 80 | 80 | 80 | 80 | 75 | 75 |
| split | [wt.-%] | 58.8 | 57.5 | 54.3 | 57.0 | 57.3 | 55.6 | 56.4 |
| MFR$_2$ | [g/10'] | 1003 | 550 | 415 | 550 | 550 | 489 | 503 |
| H2/C3 | [mol/kmol] | 38.3 | 26.4 | 22.3 | 26.4 | 25.7 | 23.1 | 29.5 |
| pressure | [bar] | 49.8 | 44.4 | 42.5 | 44.5 | 44.0 | 32 | 32 |
| activity | [kg PP/g cat × h] | 76.4 | 81.1 | 84.6 | 79.5 | 74.5 | 71.6 | 58.5 |
| GPR1 |  |  |  |  |  |  |  |  |
| time | [min] | 154 | 121 | 106 | 115 | 111 | 161 | 157 |
| temp | [° C.] | 80 | 80 | 80 | 80 | 80 | 80 | 80 |
| split | [wt.-%] | 36.1 | 36.8 | 36.2 | 36.4 | 38.2 | 38.5 | 38 |
| MFR$_2$ | [g/10'] | 213 | 79 | 60 | 79 | 79 | 57 | 60 |
| H2/C3 | mol % | 10 | 6.1 | 5.6 | 6.2 | 6.2 | 36.5 | 79.0 |
| pressure | [bar] | 32 | 32 | 32 | 32 | 32 | 32 | 32 |
| activity | [kg PP/g cat × h] | 8.1 | 10.9 | 13.3 | 12.0 | 11.5 | 8.4 | 6.3 |

TABLE 1-continued

GPR2

|  |  |  |  |  |  |  |  |  |
|---|---|---|---|---|---|---|---|---|
| time | [min] | 161 | 173 | 136 | 140 | 243 | 215 | 265 |
| temp | [° C.] | 80 | 80 | 80 | 80 | 80 | 80 | 80 |
| split | [wt.-%] | 5.1 | 5.7 | 9.5 | 6.6 | 4.5 | 5.9 | 5.6 |
| MFR$_2$ | [g/10'] × 10$^{-4}$ | 5.4 | 1.6 | 290 | 7 | 16.4 | 21 | 5 |
| H2/C3 | mol % | 0.2 | 0.13 | 0.32 | 0.22 | 0.23 | 1.53 | 3.25 |
| pressure | [bar] | 32 | 32 | 32 | 32 | 32 | 32 | 32 |
| activity | [kg PP/g cat × h] | 1.1 | 1.1 | 2.6 | 1.8 | 1.5 | 1.0 | 0.9 | n.a. = not analyzed
*molar ration of D/U is 3/7
n.d. = not detectable
*molar ratio of D/U is 3/7

TABLE 2

| a: Properties of inventive propylene homopolymers (containing 0.15 wt.-% NA11 and 0.01 wt.-% pVCH) | | | | | | |
|---|---|---|---|---|---|---|
|  |  | IE1 | IE2 | IE3 | IE4 | IE5 |
| XCS | [wt %] | 4.0 | 4.4 | 4.4 | 4.7 | 4.5 |
| MFR$_2$ | [g/10'] | 56 | 73 | 44 | 64 | 63 |
| Mn | [g/kmol] | 10 | 10 | 11** | 10** | 10 |
| Mw | [g/kmol] | 230 | 214 | 264** | 232** | 245 |
| Mz | [g/kmol] | 2283 | 2112 | 3011** | 2337** | 2248 |
| Mw/Mn | [—] | 23.0 | 21.4 | 24** | 23.** | 24.5 |
| Mz/Mw | [—] | 9.9 | 9.9 | 11.4 | 10.1** | 9.2 |
| Mz/Mn | [—] | 228.3 | 211.2 | 273.7** | 233.7** | 224.8 |
| PI | [Pa$^{-1}$] | 31 | 24 | 33 | 36 | 31 |
| eta*(0.05/300) | [—] | 41.0 | 35.7 | 45.9 | 42.8 | 39.6 |
| Tm | [° C.] | 165 | 164 | 164 | 163 | 164 |
| Hc | [J/g] | 121 | 121 | 124 | 126 | 119 |
| Tc | [° C.] | 132 | 132 | 131 | 132 | 132 |
| 2,1 e | [%] | n.d. | n.d. | n.d. | n.d. | n.d. |
| mmmm | [%] | 96.3 | 96.3 | 95.8 | 95.7 | 96.1 |
| Tg | [° C.] | −8 | −9.5 | −8 | −10 | −3 |
| TM | [MPa] | 2460 | 2449 | 2683* | 2631 | 2625 |
| TSB | [%] | 2.27 | 2.13 | 2.85* | 2.1 | 2.14 |

| b: Properties of comparative propylene homopolymers (containing 0.15 wt-% NA11 and 0.01 wt.-% pVCH, CE7 does not contain pVCH) | | | | | | | | |
|---|---|---|---|---|---|---|---|---|
|  |  | CE1 | CE2 | CE3 | CE4 | CE5 | CE6 | CE7 |
| XCS | [wt %] | 4.4 | 3.9 | 3.7 | 3.9 | 4.0 | 3.9 | 3.2 |
| MFR$_2$ | [g/10'] | 274 | 114 | 83 | 110 | 91 | 103 | 110 |
| Mn | [g/kmol] | 6 | 8 | 8 | 7 | 12 | 12 | 12 |
| Mw | [g/kmol] | 86 | 105 | 111 | 109 | 184 | 176 | 155 |
| Mz | [g/kmol] | 825 | 829 | 753 | 931 | 1504 | 1735 | 1244 |
| Mw/Mn | [—] | 14.3 | 13.1 | 13.9 | 15.6 | 15.3 | 14.7 | 12.9 |
| Mz/Mw | [—] | 9.6 | 7.9 | 6.8 | 8.5 | 8.2 | 9.9 | 8.0 |
| Mz/Mn | [—] | 137.5 | 103.6 | 94.1 | 133 | 125.3 | 145 | 104 |
| PI | [Pa$^{-1}$] | n.d. | n.d. | n.d. | n.d. | n.d. | 10 | n.d. |
| η*(0.05)/η*(300) | [—] | 7.6 | 9.8 | 9.7 | 11.7 | 12.8 | 11.8 | 9.7 |
| Tm | [° C.] | 162 | 163 | 164 | 164 | 164 | 163 | 165 |
| Tc | [° C.] | 134 | 134 | 134 | 134 | 132 | 130 | 127 |
| 2,1 e | [%] | n.d. | n.d. | n.d. | n.d. | n.d. | n.d. | n.d. |
| mmmm | [%] | 96.2 | 96.0 | 96.5 | 96.3 | 96.7 | 95.4 | 96.9 |
| Tg | [° C.] | −10 | −8 | −6 | −8 | −6 | −6 | −4 |
| TM | [MPa] | 2318 | 2347 | 2299 | 2397 | 2391 | 2423 | 2336 |
| TSB | [%] | 1.8 | 2.1 | 2.6 | 2.2 | 2.8 | 2.5 | 2.7 |

*moulding temp. 200° C.
**measured on samples without nucleation with NA11
n.d. not detectable
PI polydispersity index
η*(0.05)/η*(300) complex viscosity ratio eta*(0.05 rad/sec)/eta*(300 rad/sec)
TM tensile modulus
TSB tensile strain at break
NA11 2.2'-methylenebis (4.6.-di-tert-butylphenyl) phosphate
pVCH polyvinylcyclohexane TABLE 3a a: SIST data of the inventive propylene homopolymers homopolymers
(containing 0.15 wt-% NA11 and 0.01 wt.-% pVCH)

| Temp. Range/° C. | IE1 [wt %] | IE2 [wt %] | IE3 [wt %] | IE4 [wt %] | IE5 [wt %] |
|---|---|---|---|---|---|
| 90-100 | 0 | 0 | 0 | 0 | 0 |
| 100-110 | 0.04 | 0.03 | 0.2 | 0.09 | 0.06 |
| 110-120 | 0.36 | 0.34 | 0.59 | 0.39 | 0.33 |
| 120-130 | 1.01 | 0.98 | 1.31 | 1.07 | 0.95 |
| 130-140 | 2.04 | 2.01 | 2.39 | 2.08 | 1.96 |
| 140-150 | 4.47 | 4.45 | 4.78 | 4.49 | 4.29 |
| 150-160 | 14.16 | 14.23 | 13.07 | 13.94 | 13.86 |
| 160-170 | 59.11 | 60.32 | 53.52 | 57.99 | 57.96 |
| 170-180 | 18.83 | 17.61 | 24.07 | 19.86 | 20.57 |
| 180- | | | | | |
| SIST ratio | 3.53 | 3.54 | 3.47 | 3.53 | 3.66 | b: SIST data of the comparative propylene homopolymers
(containing 0.15 wt-% NA11 and 0.01 wt.-% pVCH, CE7 does not contain pVCH)

| Temp. Range/° C. | CE1 [wt %] | CE2 [wt %] | CE3 [wt %] | CE4 [wt %] | CE5 [wt %] | CE6 [wt %] | CE7 [wt %] |
|---|---|---|---|---|---|---|---|
| 90-100 | 0 | 0.04 | 0.15 | 0 | n.d | 0.19 | 0 |
| 100-110 | 0.03 | 0.09 | 0.21 | 0 | n.d | 0.27 | 0.02 |
| 110-120 | 0.39 | 0.42 | 0.54 | 0.27 | n.d | 0.56 | 0.28 |
| 120-130 | 1.12 | 1.11 | 1.19 | 0.95 | n.d | 1.18 | 0.88 |
| 130-140 | 2.32 | 2.20 | 2.24 | 1.99 | n.d | 2.04 | 1.81 |
| 140-150 | 4.89 | 4.60 | 4.64 | 4.41 | n.d | 4.3 | 3.94 |
| 150-160 | 15.09 | 14.06 | 14.30 | 14.03 | n.d | 13.33 | 12.37 |
| 160-170 | 65.54 | 57.09 | 56.88 | 58.97 | n.d | 57.29 | 56.04 |
| 170-180 | 10.62 | 20.39 | 19.81 | 19.38 | n.d | 20.76 | 24.64 |
| 180- | | | | | | 0.05 | |
| SIST ratio | 3.19 | 3.44 | 3.29 | 3.62 | n.d | 4.18 | 3.56 |

SIST ratio: the weight ratio of the crystalline fractions melting in the temperature range of above 160 to 180° C. to the crystalline fractions melting in the temperature range of 90 to 160 [(>160-180)/(90-160)]

The invention claimed is:

1. Polypropylene having:
   (a) a melt flow rate $MFR_2$ (230° C.) measured according to ISO 1133 of at least 20 g/10min; and
   (b) a complex viscosity ratio eta*(0.05 rad/sec)/eta*(300 rad/sec) of at least 20.0 measured by dynamic rheology according to ISO 6271-10 at 200° C.;
   wherein said polypropylene has a first polypropylene fraction (PP1), a second polypropylene fraction (PP2), and a third polypropylene fraction (PP3), said first polypropylene fraction(PP1), second polypropylene fraction (PP2), and third polyproplene fraction (PP3)differ in the melt flow rate $MFR_2$ (230° C. by at least 30 g/10min.

2. Polypropylene according to claim 1, wherein said polypropylene has:
   a ratio of weight average molecular weight (Mw) to number average molecular weight (Mn) [Mw/Mn] of at least 15.0 determined by Gel Permeation Chromatography (GPC).

3. Polypropylene according to claim 1, wherein said polypropylene has
   (a) a xylene cold soluble content (XCS) determined according ISO 16152 (25° C.) of at least 2.8 wt. %; and/or
   (b) a melting temperature Tm of more than 161° C.

4. Polypropylene according to claim 1, wherein said polypropylene has:
   (a) 2,1 erythro regio-defects of equal or below 0.4 mol.-% determined by $^{13}$C-NMR spectroscopy; and/or
   (b) a pentad isotacticity (mmmm) of more than 95.0 mol. %.

5. Polypropylene according to claim 1, wherein said polypropylene has:
   (a) a ratio of z-average molecular weight (Mz) to weight average molecular weight (Mw) [Mz/Mw] of at least 9.0; and/or
   (b) a ratio of z-average molecular weight (Mz) to number average molecular weight (Mn) [Mz/Mn] of at least 150.

6. Polypropylene according to claim 1, wherein said polypropylene is α-nucleated.

7. Polypropylene according to claim 1, wherein said polypropylene has:
   (a) a weight ratio of the crystalline fractions melting in the temperature range of above 160 to 180° C. to the crystalline fractions melting in the temperature range of 90 to 160 of at least 3.20, wherein said fractions are determined by the stepwise isothermal segregation technique (SIST); and/or
   (b) a crystallization temperature of at least 125° C.; and/or
   (c) a tensile modulus measured according to ISO 527-2 of at least 2250 MPa.

8. Polypropylene according to claim 1, wherein said polypropylene has a first polypropylene fraction (PP1), a second polypropylene fraction (PP2) and a third polypropylene fraction (PP3), and the amount:
   (a) of the first polypropylene fraction (PP1) is in the range of 40 to 60 wt. %,
   (b) of the second polypropylene fraction (PP2) is in the range of 20 to 59.0 wt. %, and
   (c) of the third polypropylene fraction (PP3) is in the range of 1.0 to 15.0 wt. %,
   based on the total amount of the polypropylene.

9. Polypropylene according to claim 1, wherein:
   (a) the melt flow rate $MFR_2$ (230° C.) of the first polypropylene fraction (PP1) is at least 5 times higher than the melt flow rate $MFR_2$ (230° C.) of the second polypropylene fraction (PP2); and/or (b) the melt flow rate $MFR_2$ (230° C.) of the second polypropylene fraction (PP2) is at least 5,000 times higher than the melt flow rate $MFR_2$ (230° C.) of the third polypropylene fraction (PP3).

10. Polypropylene according to claim 1, wherein:

(a) the melt flow rate $MFR_2$ (230° C.) of the first polypropylene fraction (PP1) is at least 200 g/10min; and/or (b) the melt flow rate $MFR_2$ (230° C.) of the second polypropylene fraction (PP2) is in the range of 10 to below 200 g/10min; and/or (c) the melt flow rate $MFR_2$ (230° C.) of the third polypropylene fraction (PP3) is below 0.1 g/10min.

11. Process for the manufacture of the polypropylene according to claim 1, in a sequential polymerization system comprising a pre-polymerization reactor (PR) and at least three polymerization reactors (R1), (R2) and (R3) connected in series, feeding propylene (C3) and optionally hydrogen (H2) to said pre-polymerization reactor (PR) in a H2/C3 feed ratio of 0.00 to 0.10 mol/kmol to form a pre-polypropylene (Pre-PP) and polymerizing the pre-polypropylene (Pre-PP) in the at least three polymerization reactors (R1), (R2), and (R3), wherein the polymerization in the at least three polymerization reactors (R1), (R2) and (R3) takes place in the presence of a Ziegler-Natta catalyst (ZN-C), said Ziegler-Natta catalyst (ZN-C) comprises (a) a pro-catalyst (PC) comprising a titanium compound (TC) having at least one titanium-halogen bond and an internal donor (ID), both supported on a magnesium halide;

(b) a co-catalyst (Co); and (c) an external donor (ED);

wherein:

the internal donor (ID) comprises at least 80 wt.-% of a compound selected from the group consisting of succinate, citraconate, di-ketone, enaminoimine, and mixtures thereof;

the mol-ratio of co-catalyst (Co) to external donor (ED) [Co/ED] of said Ziegler-Natta catalyst (ZN-C) is below 20.0; and said Ziegler-Natta catalyst (ZN-C) is present in the pre-polymerization reactor (PR).

12. Process according to claim 11, wherein:

(a) the mol-ratio of co-catalyst (Co) to titanium compound (TC) (TC) [Co/TC] is at most 130; and/or (b) the mol-ratio of external donor (ED) to titanium compound (TC)) [Co/TC] is below 50.

13. Process according to claim 11, wherein:

(a) the operating temperature in the pre-polymerization reactor (PR) is in the range of more than 20° C. to 80° C.; and/or (b) the average residance time of the Ziegler-Natta catalyst (ZN-C) in the pre-polymerization reactor (PR) is in the range of more than 3 to 20 min.

14. Process according to claim 11, wherein:

(a) the average residence time in the first polymerization reactor (R1) is at least 20 min; and/or (b) the average residence time in the second polymerization reactor (R2) is at least 30 min; and/or (c) the average residence time in the third polymerization reactor (R3) is at least 80 min; and/or (d) the total residence time in the three reactors (R1), (R2), and (R3) together is at most 700 min.

15. Process according to claim 11, wherein:

(a) the feed ratio of hydrogen ($H_2$) to propylene ($C_3$) [$H_2/C_3$] in the first polymerization reactor (R1) is in the range of 10 to 60 mol/kmol; and/or (b) the feed ratio of hydrogen ($H_2$) to propylene ($C_3$) [$H_2/C_3$] in the second polymerization reactor (R2) is in the range of 10 to 260 mol/kmol; and/or (c) the feed ratio of hydrogen ($H_2$) to propylene ($C_3$) [$H_2/C_3$] in the third polymerization reactor (R3) is in the range of 0 to 20 mol/kmol.

16. Polypropylene according to claim 1, wherein said polypropylene has a polydispersity index (PI) of at least 10.0.

* * * * *

UNITED STATES PATENT AND TRADEMARK OFFICE
CERTIFICATE OF CORRECTION

PATENT NO. : 9,587,044 B2  
APPLICATION NO. : 14/895141  
DATED : March 7, 2017  
INVENTOR(S) : Norbert Hafner et al.

Page 1 of 1

It is certified that error appears in the above-identified patent and that said Letters Patent is hereby corrected as shown below:

In the Claims

Column 27, Line 46 reads "polyproplene" should read --polypropylene--

Signed and Sealed this  
Twelfth Day of September, 2017

Joseph Matal  
*Performing the Functions and Duties of the*  
*Under Secretary of Commerce for Intellectual Property and*  
*Director of the United States Patent and Trademark Office*